Aug. 21, 1956

C. CROSS 2,759,735

LATHE CHUCK ORIENTING MEANS

Filed Sept. 29, 1955

2 Sheets-Sheet 1

INVENTOR
*Clint Cross*

BY *Ashley & Ashley*

ATTORNEYS

Aug. 21, 1956 — C. CROSS — 2,759,735
LATHE CHUCK ORIENTING MEANS
Filed Sept. 29, 1955

INVENTOR
Clint Cross

United States Patent Office 2,759,735
Patented Aug. 21, 1956

2,759,735

LATHE CHUCK ORIENTING MEANS

Clint Cross, Tulsa, Okla., assignor to Dover Corporation, Washington, D. C., a corporation of Delaware Application September 29, 1955, Serial No. 537,374

9 Claims. (Cl. 279—110)

This invention relates to new and useful improvements in chucks and more particularly to orienting means for lathe chucks.

One object of the invention is to provide an improved chuck having novel means for orienting polygonal articles relative to the jaws of the chuck.

An important object of the invention is to provide improved orienting means for a chuck of such construction as to automatically position work of angular cross-section with respect to the jaws of the chuck so that said jaws grip the flat surfaces of the work instead of the corners or edges between said flat surfaces.

A particular object of the invention is to provide improved orienting means, of the character described, which includes a spring-pressed member carried by one of the jaws of the chuck for movement and coaction therewith and having a complementary jaw face for engaging the polygonal work and forcing its flat surfaces into parallel relation with the faces of the jaws upon movement of said jaws toward each other.

A further object of the invention is to provide improved orienting means, of the character described, which is adapted for use with elongated articles having angular surfaces, such as rods, and which is arranged to be mounted on the jaws of vises and holding devices, such as lathe chucks, of pneumatic, hydraulic or other type, having means for accommodating elongated articles.

A construction designed to carry out the invention will be hereinafter described together with other features of the invention.

Figures 1, 2, 3, 4:
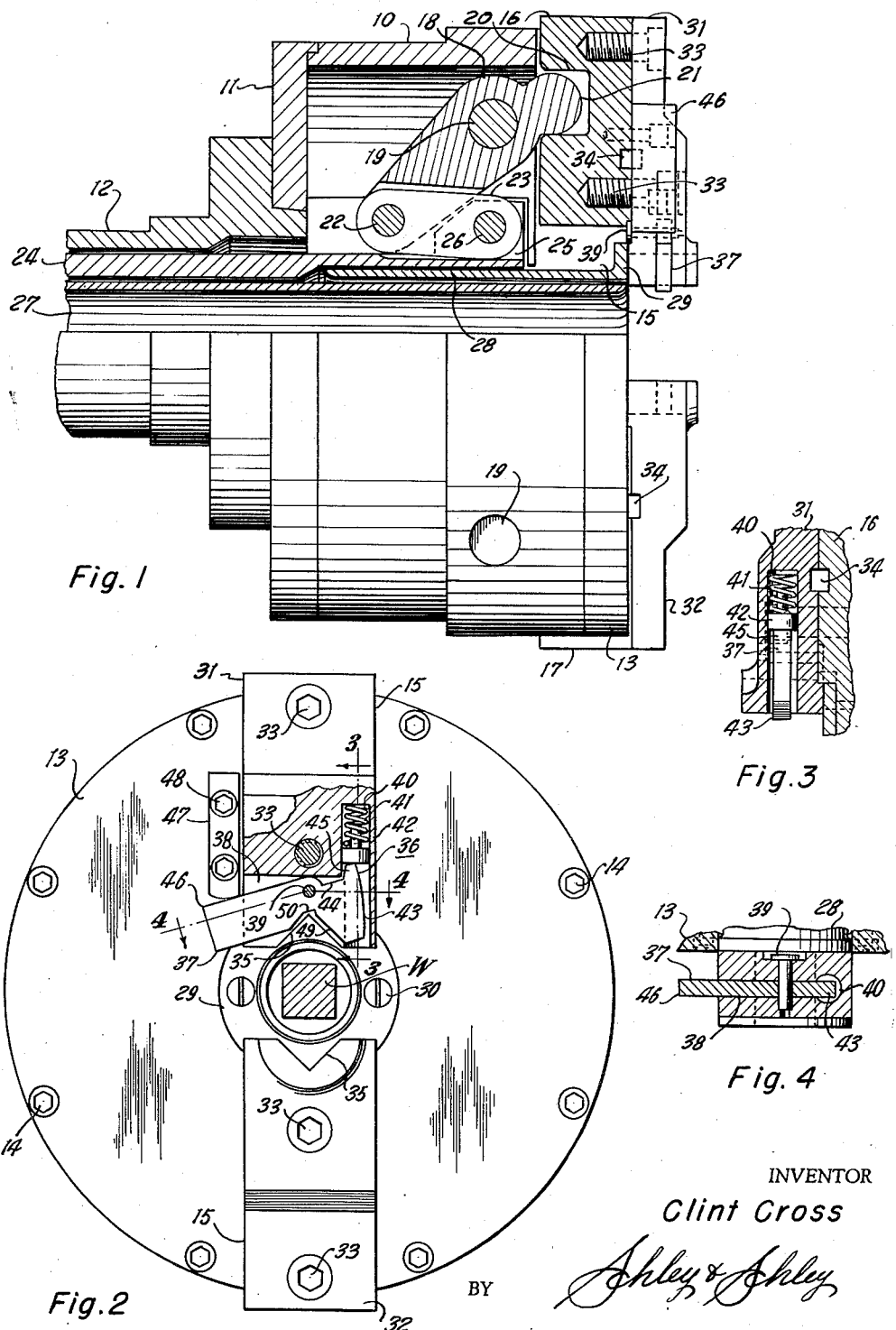

The invention will be more readily understood from a reading of the following specification and by reference to the accompanying drawings, wherein an example of the invention is shown, and wherein:

Fig. 1 is a side elevational view, partly in section, of a lathe chuck having orienting means mounted thereon in accordance with the invention, Fig. 2 is a front elevational view, partly in section, of the chuck and orienting means with unoriented work between the jaws of said chuck, Fig. 3 is a transverse, vertical, sectional view, taken on the line 3—3 of Fig. 2, Fig. 4 is a horizontal, cross-sectional view, taken on the line 4—4 of Fig. 2, Figs. 5, 6, 7 and 8 are front elevational views of the chuck showing the closing movement of its jaws and the turning of unoriented work by the orienting means.

In the drawings, the numeral 10 designates the cylindrical body of a lathe chuck which is shown as being of the penumatic or hydraulic type and which has an adapter plate 11 for mounting on one end of a tubular lathe spindle 12. An angular face plate 13 is secured to the outer end of the chuck body 10 opposite the adapter plate 11 by recessed bolts 14 (Fig. 2). The outer end of the chuck body and its face plate 13 have a pair of diametrically-opposed, radial slots or grooves 15 for slidable engagement by a pair of master jaws 16 and 17.

An operating lever 18 is disposed in the hollow interior of the body for actuating each master jaw and its outer end is pivoted on a transverse pin 19 having its ends journaled in the wall of said body adjacent the slot 15. Each master jaw is rectangular, being of greater length than width, and has a recess or socket 20 in its inner surface for engagement by a lug or projection 21 on the outer end of the operating lever. The inner end of the lever 18 is pivotally connected by a transverse pin 22 to the inner end of a link 23.

A coaxial, draw tube 24 extends through the bore of the spindle 12 into the chuck body and has an external, radial lug or projection 25 on its outer end connected to the outer end of each link 23 by a pivot pin 26. The draw tube is adapted to be reciprocated by a pneumatic or hydraulic cylinder or other suitable means (not shown) for pivoting the link 23 and lever 18 to reciprocate each master jaw longitudinally of its slot 15. Thus, the jaws 16 and 17 are closed and opened or moved toward and away from each other by reciprocation of the draw tube 24. A wear tube 27 is mounted concentrically within the draw tube and extends beyond the outer end of said draw tube to the outer surface of the face plate 13. Preferably, the outer end portions of the draw and wear tubes have a dust bushing 28 interposed therebetween and extending through the face plate, with a radial flange 29 on its outer end recessed in said plate and fastened thereto by suitable screws 30 (Fig. 2).

It is noted that the master jaws 16 and 17 project a slight distance beyond the outer surface of the face plate 13 and have jaw elements 31 and 32 overlying their upright outer surfaces and fastened thereto by suitable recessed bolts 33. As shown by the numeral 34 in Fig. 1, each jaw element is secured to its master jaw by a transverse key. The jaw elements are substantially rectangular, being of greater length than width or thickness, and extend inwardly of the master jaws for engagement with each other upon closing movement of said jaws toward each other. An angular or V-shaped jaw face 35 is formed on the inner end of each jaw element for engagement with work W. Although subject to variation, the jaw faces 35 are shown as being right angular and having flat surfaces for gripping engagement with work which is rectangular in cross-section or with work having portions of such cross-section.

Frequently, the work W is of elongated length and may be well pump rods or other rods having polygonal portions, such as wrench faces, and other portions requiring machining. In order to hold the work against turning, it is necessary for the jaw faces to firmly grip said work with the flat surfaces of said jaw faces and work in parallel or engaging relation. Manifestly, the work may slip if the jaw faces engage the corners of the polygonal work instead of the flat surfaces thereof.

In order to orient the work with respect to the jaw faces, one or both of the jaw elements and preferably the jaw element 31 is provided with means 36 for automatically orienting the work. As shown most clearly in Figs. 2, 3, and 4, the orienting means includes an angular kicker member or rocker arm 37 pivotally mounted for swinging movement in a slot or recess 38 extending transversely across the inner end of the jaw element 31 at its medial portion. A pivot pin 39 extends transversely across the upper medial portion of the slot 38 for supporting the rocker arm above the jaw face 35 of the jaw element 31. One end of the slot 38 is open, while its other end is closed by and communicates with a cylindrical bore 40 extending longitudinally of the jaw element adjacent one of its lateral margins. The bore is of greater depth than the slot and extends outwardly thereof for housing a helical spring 41 and a follower or guide 42.

An enlarged, offset head 43 is formed on the inner end of the rocker arm 37 and has a recessed portion 44 adjacent its pivot pin 39 to provide a lug or projection 45 for engagement with the follower 42, whereby said arm is constantly urged to pivot in a clockwise direction by the spring 41. The recessed portion 44 of the angular kicker member or arm permits the lug 45 to clear the bottom of the slot 38 and enter the outer portion of the bore 40 for compressing the spring. As shown by the numeral 46, the outer or opposite end portion of the arm is elongated and projects from the open end of the slot laterally of the jaw element. A cam or stop member 47 is fastened by suitable bolts 48 to the outer surface of the face plate 13 in overhanging relation to the projecting end 46 of the arm for engagement therewith when the jaws 16 and 17 are opened as shown in Fig. 2. This engagement swings the arm counterclockwise about its pivot pin so as to compress the spring and position the head 43 of said arm above the inner end of the jaw element.

Figure 8:
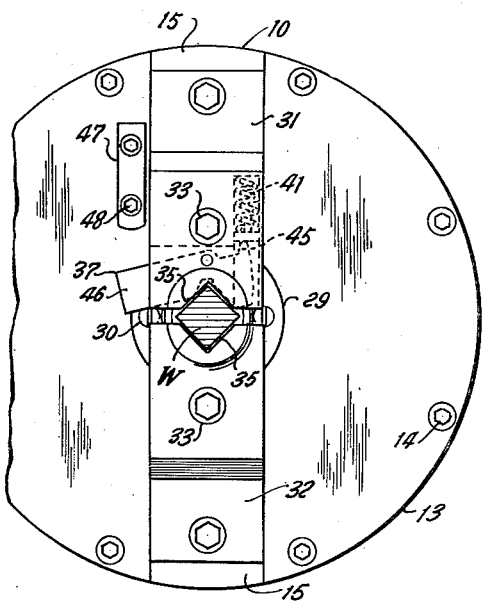

A substantially V-shaped notch or recess 49 is formed in the rocker arm contiguous its head and inwardly of its pivot pin for registration with the jaw face 35 of the jaw element 31 when the jaws 16 and 17 are opened. It is noted that one surface of the notch forms one margin of the head. As shown by the numeral 50, the apex portion of the notch 49 is widened to make certain that the apex of the jaw face is free from obstruction when the arm is pivoted counterclockwise with its head disposed above the inner end of the jaw element (Figs. 2 and 8). The kicker is arranged to automatically orient the work W upon closing of the jaws when said work is unoriented or has its flat surfaces in non-parallel relation to the flat surfaces of the jaw faces. Since the arm is pivotally mounted and spring-pressed, its head 43 projects inwardly beyond the jaw element and its jaw face when said arm is permitted to pivot clockwise.

Figure 5:
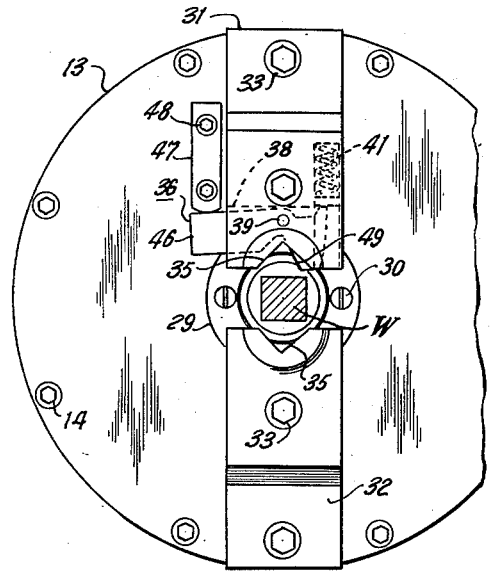
Figure 6:
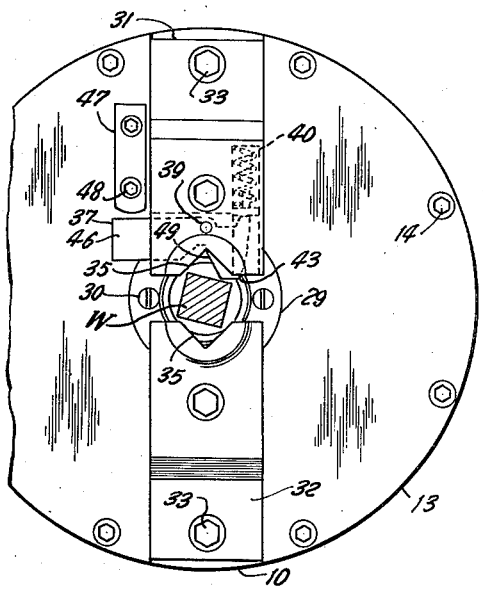
Figure 7:
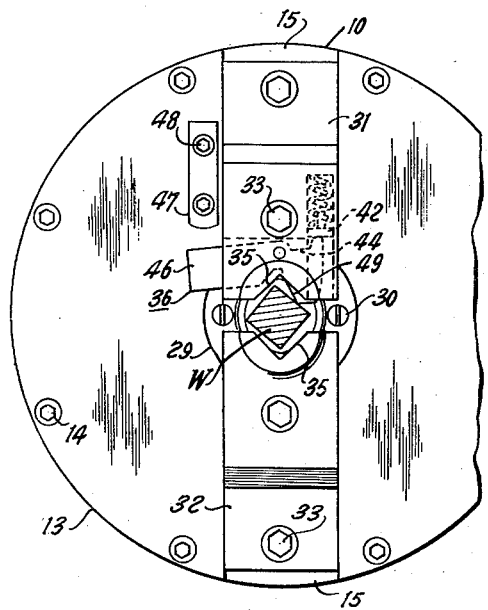

As shown in Fig. 5, the spring 41 commences to pivot the rocker arm clockwise upon initial closing movement of the jaws due to the inward movement of said arm with its jaw element away from the cam 47. If the work is unoriented, the edge portion of the flat work surface adjacent the head is engaged by said head and said work is forced to turn clockwise as shown in Figs. 6 and 7. This turning is assisted by the notch 49 of the arm, being permitted by the angularity of the jaw faces 35, and continues until the work is oriented as shown in Fig. 8, whereby the flat surfaces of said jaw faces and work are in parallel, engaging relation. In this manner, the work may be firmly gripped and held stationary by the jaw faces without the necessity of manually orienting said work.

Upon engagement of the flat surfaces of the jaw faces and work, the rocker arm 37 is swung counterclockwise so as to dispose its head 43 within the slot 38 and its communicating bore 40. Upon opening of the jaws, the spring urges the arm to pivot clockwise until its projecting end 46 strikes the cam 47 and reverses the pivotal movement of said arm. When the jaws are completely open as shown in Fig. 2, the cam functions to hold the arm in its retracted position clear of the jaw face. Due to the provision of the spring 41, a resilient force is provided for kicking the work into orientation with the jaw faces 35 upon closing of the master jaws 16 and 17. Obviously, this arrangement permits the arm to ride over the surfaces and corners of the work without binding or hanging thereupon. It is noted that the orienting means is applicable to chucks, vises and holding devices other than lathe chucks.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In a chuck, a chuck body, a pair of chuck jaws slidably mounted on the body for closing and opening movement toward and away from each other, angular jaw faces on the inner ends of the jaws for coacting engagement with polygonal work, and means carried by and movable with one of said jaws for engaging and orienting the work with respect to the jaw faces upon closing movement of said jaws.

2. In a chuck as set forth in claim 1 wherein the orienting means includes a spring-pressed member pivotally mounted on one of the jaws and projecting inwardly of its jaw face for engagement with the work.

3. In a chuck as set forth in claim 2, means mounted on the chuck body adjacent the jaw and its orienting means for engaging and pivoting the orienting means to a retracted position upon opening of the jaws.

4. In a chuck, a chuck body, a pair of chuck jaws slidably mounted on the body for closing and opening movement toward and away from each other, angular jaw faces on the inner ends of the jaws for coacting engagement with polygonal work, and spring-pressed orienting means carried by and movable with one of said jaws and projecting inwardly of its jaw face so as to engage and orient the work with respect to the jaw faces upon closing movement of said jaws.

5. In a chuck as set forth in claim 4 wherein the orienting means is pivotally mounted on one of the jaws for projection and retraction relative to its jaw face, and means on the chuck body adjacent said jaw for engagement with said orienting means upon opening of said jaws to pivot said orienting means to its retracted position.

6. In a lathe chuck, a chuck body, a pair of chuck jaws slidably mounted on the body for radial closing and opening movement, angular jaw faces on the inner ends of the jaws and having flat surfaces for coacting engagement with the flat surfaces of polygonal work to grip the work upon closing of said jaws, and spring-pressed orienting means movably mounted on one of said jaws for projection and retraction relative to its jaw face, the orienting means projecting inwardly of the jaw face to engage unoriented work and apply a resilient force thereto for turning said work with its flat surfaces in parallel relation to the flat surfaces of the jaw faces upon closing movement of said jaws, said orienting means moving to its retracted position upon engagement of the flat surfaces of said jaw faces and work.

7. In a lathe chuck as set forth in claim 6 wherein the orienting means includes an angular pivoted member having an offset portion for engagement with the work, and a spring engaging the member to permit retraction of its offset portion and to urge said portion into projecting relation to the jaw face.

8. In a lathe chuck as set forth in claim 7 wherein the angular member has a recess substantially complementary to the jaw face for registration therewith upon retraction of the offset portion of said member.

9. In a lathe chuck as set forth in claim 7, a stop member mounted on the chuck body adjacent the angular member for engagement therewith upon opening of the jaws to pivot said member to its retracted position.

No references cited.